(12) United States Patent
Sakai et al.

(10) Patent No.: US 6,304,289 B1
(45) Date of Patent: Oct. 16, 2001

(54) SUBMERGED LASER TELEVISION AND SUBMERGED LASER VISUAL RECOGNIZER

(75) Inventors: Hiroshi Sakai; Kenzi Hirose; Hirotoshi Igarashi, all of Niigata; Junichi Akizono; Eiji Satoh, both of Yokosuka; Yoshiaki Takahashi, Tokyo; Harukazu Asatsuma, Tokyo; Toshitaka Saito, Tokyo; Ichiro Fujii, Yokohama, all of (JP)

(73) Assignees: Director General of the 1st District Port Construction Bureau, Ministry of Transport, Niigata; Director General of Port Harbour Research Institute, Ministry of Transport, Yokosuka; Ishikawajima-Harima Heavy Industries Co., Ltd., Tokyo, all of (JP)

( * ) Notice: Subject to any disclaimer, the term of this patent is extended or adjusted under 35 U.S.C. 154(b) by 0 days.

(21) Appl. No.: 09/091,359

(22) PCT Filed: Oct. 27, 1997

(86) PCT No.: PCT/JP97/03881

§ 371 Date: Jun. 19, 1998

§ 102(e) Date: Jun. 19, 1998

(87) PCT Pub. No.: WO98/19178

PCT Pub. Date: May 7, 1998

(30) Foreign Application Priority Data

Oct. 28, 1996 (JP) .................................................. 8-285626
Dec. 18, 1996 (JP) .................................................. 8-338774

(51) Int. Cl.⁷ ............................... H04N 7/18; H04N 9/47
(52) U.S. Cl. ............................................................ 348/81
(58) Field of Search ................... 348/81, 61; 396/25–26, 396/28; 206/316.2; 382/312

(56) References Cited

U.S. PATENT DOCUMENTS 3,668,986 * 6/1972 Lemaire ................................. 396/28
3,757,042 * 9/1973 Funk ...................................... 348/81
4,485,398 * 11/1984 Chapin, Jr. et al. ................... 348/81
4,862,257 * 8/1989 Ylich ..................................... 348/31
5,181,135 * 1/1993 Keeler .................................... 348/81
5,243,541 * 9/1993 Ulich ..................................... 348/81
5,343,284 * 8/1994 Keeler et al. ....................... 356/4.01
5,604,582 * 2/1997 Rhoads et al. ........................ 356/73
5,778,259 * 7/1998 Rink ...................................... 396/27
5,822,047 * 10/1998 Contarino et al. .................. 356/5.01
6,064,824 * 5/2000 Rink ...................................... 396/25
6,091,443 * 7/2000 Ford et al. ............................. 348/81
6,097,424 * 8/2000 Zernov et al. ........................ 348/81
6,115,511 * 9/2000 Sakai et al. .......................... 382/312

FOREIGN PATENT DOCUMENTS

0838696A1 * 4/1998 (EP) ............................... G01S/17/89
2307369A * 5/1997 (GB) .............................. G01S/17/89
06261231    9/1994 (JP) .
0600838    10/1994 (JP) .

OTHER PUBLICATIONS

Caimi, Frank M., "A review of recent underwater imaging methods and advancements", IEEE, pp. 69–71, Aug. 1996.*

* cited by examiner

*Primary Examiner*—Vu Le
(74) *Attorney, Agent, or Firm*—Oblon, Spivak, McClelland, Maier & Neustadt, P.C.

(57) ABSTRACT

An underwater laser television, which radiates laser pulses, output from a laser oscillator, to a visualized object under water and detects reflection light of the laser pulses to display an image of the visualized object, is constructed by a main body which is located under water to have a capability of free movement and to resist against the water pressure and which provides a light transmission portion for transmitting the laser pulses and reflection light, the laser oscillator arranged inside of the main body, radiation and light receiving means, arranged in the main body, which radiates the laser pulses toward the visualized object and detects the reflection light to produce video signals of the visualized object, and display means, arranged in the main body, which displays an image of the visualized object based on the video signals.

20 Claims, 5 Drawing Sheets

SUBMERGED LASER TELEVISION AND SUBMERGED LASER VISUAL RECOGNIZER

TECHNICAL FIELD

The present invention relates to underwater laser televisions and underwater laser visualization devices which use laser beams to visualize visualized objects located under water.

BACKGROUND ART

There are provided laser visualization devices which use laser beams to clearly visualize visualized objects located under water whose transparency is not good. The official gazette of Japanese Patent Laid-Open Publication No. Hei 7-072250, which is a patent gazette in Japan, and the like disclose the technology of such laser visualization devices.

Conventionally, this type of the laser visualization device is constructed by a laser oscillator which generates laser pulses (pulse-like laser beams), a light radiation detection device which radiates the laser pulses to a visualized object under water and which detects reflection light, and a control device which controls a direction of the light radiation detection device and which displays an image of the visualized object based on an output of the light radiation detection device. Among them, the laser oscillator and control device are equipped on a support ship on the sea, while the light radiation detection device is arranged and fixed in proximity to the visualized object under water.

In addition, this type of the laser visualization device is designed as follows:

Laser pulses generated by the laser oscillator equipped on the support ship are lead to the light radiation detection device, placed under water, via an optical fiber cable the laser pulses are radiated to the visualized object from the light radiation detection device, so that reflection light from the visualized object is detected by the light radiation detection device; and detection signals are transmitted to the control device on the support ship, so that an image of the visualized object is displayed on the monitor and the like.

Further, in the conventional laser visualization device, the light radiation detection device is provided inside of a pressure-proof vessel to provide resistance against water pressure and is supported by a pan-tilt device. In this case, the light radiation detection device has a relatively heavy weight, so it is necessary to use a relatively large size for the pan-tilt device. In the case where such a large size of the pan-tilt device is used, it is inconvenient to carry the light radiation detection device, so workability for the fixing work of the light radiation detection device under water is not good, while workability for the transfer of the device once fixed is not good as well.

On one hand, it is known that by improving the intensity of the laser pulses, a more clear image of the visualized object can be obtained. However, as described above, conventionally the laser pulses are transmitted and supplied to the light radiation detection device under water from the laser oscillator on the support ship via the optical fiber cable, so the intensity of the laser pulses which can be radiated to the visualized object is restricted by the light transmission capacity of the optical fiber cable. Therefore, it is not possible to obtain a sufficiently clear image of the visualized object, particularly in the case where the visibility distance becomes great, deterioration of the image is remarkable. Further, a YAG-OPO (Optical Parametric Oscillator) or else is used for the laser oscillator, so there is a problem that consumption of electric power is great.

Further, the light radiation detection device is constructed by a pan-tilt device which changes a radiation direction of laser pulses as well as a laser radiation unit and a laser receiving unit which are fixed on the pan-tilt device, wherein the pan-tilt device is fixed in proximity to the visualized object. Therefore, a range of the visualized object is limited by a mounting position of the light radiation detection device, while in the case where multiple visualized objects are subjected to visualization, it is necessary to change the mounting position of the light radiation detection device every time, which is not very handy. Changing of the mounting position of the light radiation detection device having a certain level of weight is very troublesome and is not good in workability.

DISCLOSURE OF INVENTION

This invention is made to solve the aforementioned problems and is provided to achieve objects as follows:

(1) To provide an underwater laser television which is capable of moving an image pickup location with ease;

(2) To provide an underwater laser television which is capable of picking up an image of a visualized object with a good workability;

(3) To provide an underwater laser television which is capable of obtaining an image of a visualized object more clearly;

(4) To provide an underwater laser television which is capable of radiating laser pulses having higher intensity to a visualized object;

(5) To provide an underwater laser visualization device which is capable of changing a radiation direction of laser pulses without using a pan-tilt device of a large size;

(6) To provide an underwater laser visualization device which is capable of moving an image pickup location under water with ease;

(7) To provide an underwater laser visualization device which is capable of picking up an image of a visualized object with a good workability;

(8) To provide an underwater laser visualization device which is capable of obtaining an image of a visualized object more clearly; and (9) To provide an underwater laser visualization device which is capable of reducing consumption of electric power.

To achieve these objects, as the technical means regarding the underwater television, the present invention employs, in the underwater television that laser pulses output from a laser oscillator are radiated to a visualized object so that reflection light of the laser pulses is detected to display an image of the visualized object, a set of means comprising: a main body which is located under water to have a capability of free movement and to resist water pressure and which is equipped with a light transmission portion that transmits laser pulses and reflection light; a laser oscillator arranged inside of the main body; radiation and light receiving means, arranged inside of the main body, which radiates laser pulses to a visualized object and which detects reflection light to produce video signals of the visualized object; and display means, arranged inside of the main body, which displays an image of the visualized object based on the video signals.

By employing such a set of means, devices which are required to pick up an image of the visualized object and to display the image are provided inside of the main body located under water, so it is very easy to move an image pickup location under water.

In addition, as the technical means regarding the underwater laser visualization device, the present invention employs, in the underwater laser visualization device that radiates laser pulses to a visualized object located under water so as to produce an image of the visualized object based on reflection light of the laser pulses, a construction of a set of means comprising: radiation and light receiving means which radiates laser pulses and which receives the reflection light to produce an image of a visualized object; a light course setting device which sets a course of progression of the laser pulses radiated from the radiation and light receiving means to be identical to a first direction or a second direction that crosses the first direction at a right angle and which sets a course of progression of reflection light, incoming from the first direction or second direction, to be identical to a receiving light axis of the radiation and light receiving means; a pressure-proof vessel which stores the light course setting device and the radiation and light receiving means and which provides first and second light transmission windows that transmit the laser pulses and reflection light, of which courses of progression are set by the light course setting device; mounting means, fixed by a support body, which supports the pressure-proof vessel to have a capability of free rotation while using the first direction as a direction of rotation axis.

By employing such a set of means, without changing the direction of the underwater laser visualization device, laser pulses are radiated to the visualized object positioned in the first direction or the visualized object positioned in the second direction perpendicular to the first direction, so it is possible to pick up an image of the visualized object. In addition, the pressure-proof vessel is subjected to rotation while using the first direction as the direction of the rotation axis, so it is possible to pick up an image by the easy setting of a radiation direction of the laser pulses within a plane perpendicular to the first direction. Therefore, it is possible to improve workability of the image pickup work of the visualized object under water, and it is possible to change the radiation direction of the laser pulses and pick up an image of the visualized object without using a pan-tilt device of a large size used in the conventional technology.

BRIEF DESCRIPTION OF DRAWINGS

With respect to a best mode of embodiment of the present invention which will be described below, a description is given for easy understanding with reference to drawings as follows.

BEST MODE FOR CARRYING OUT THE INVENTION

Figure 2:
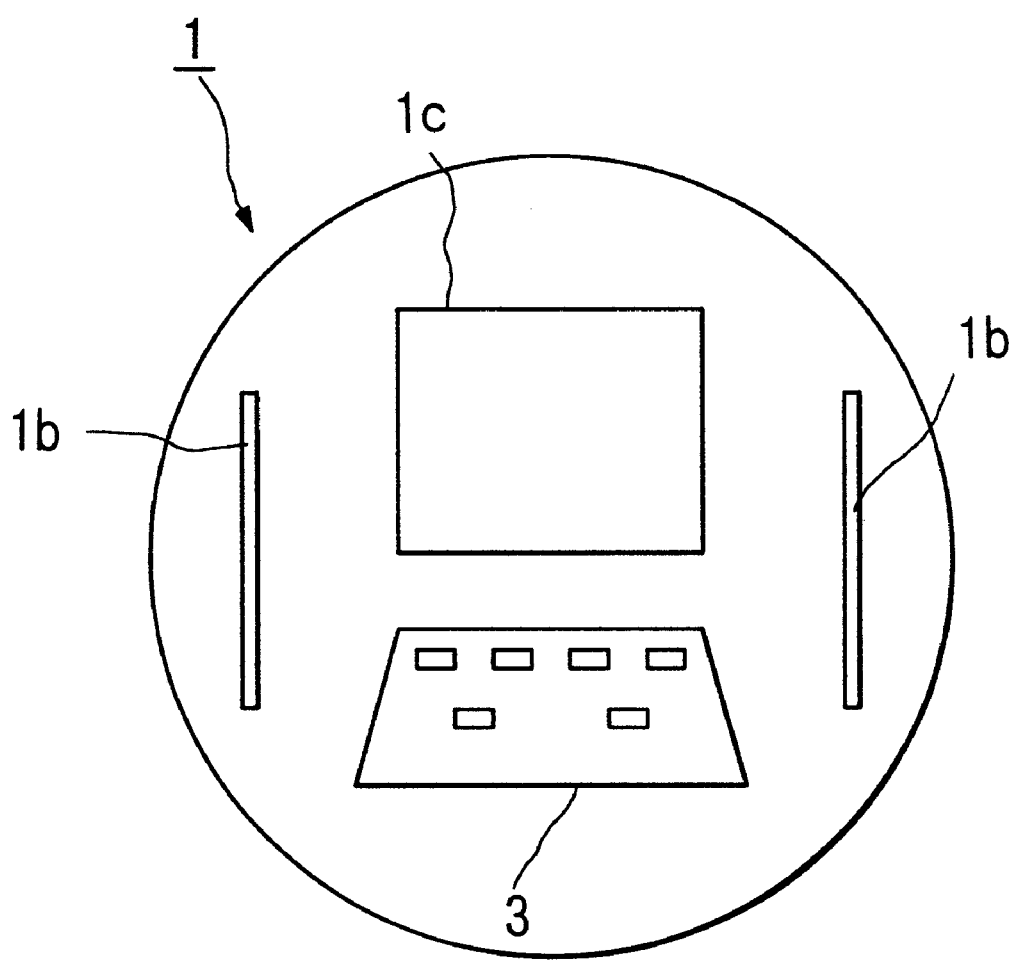
FIG. 2 is a plan view showing a construction in back view of a main body in the example of the underwater laser television in accordance with the present invention.
Figure 3:
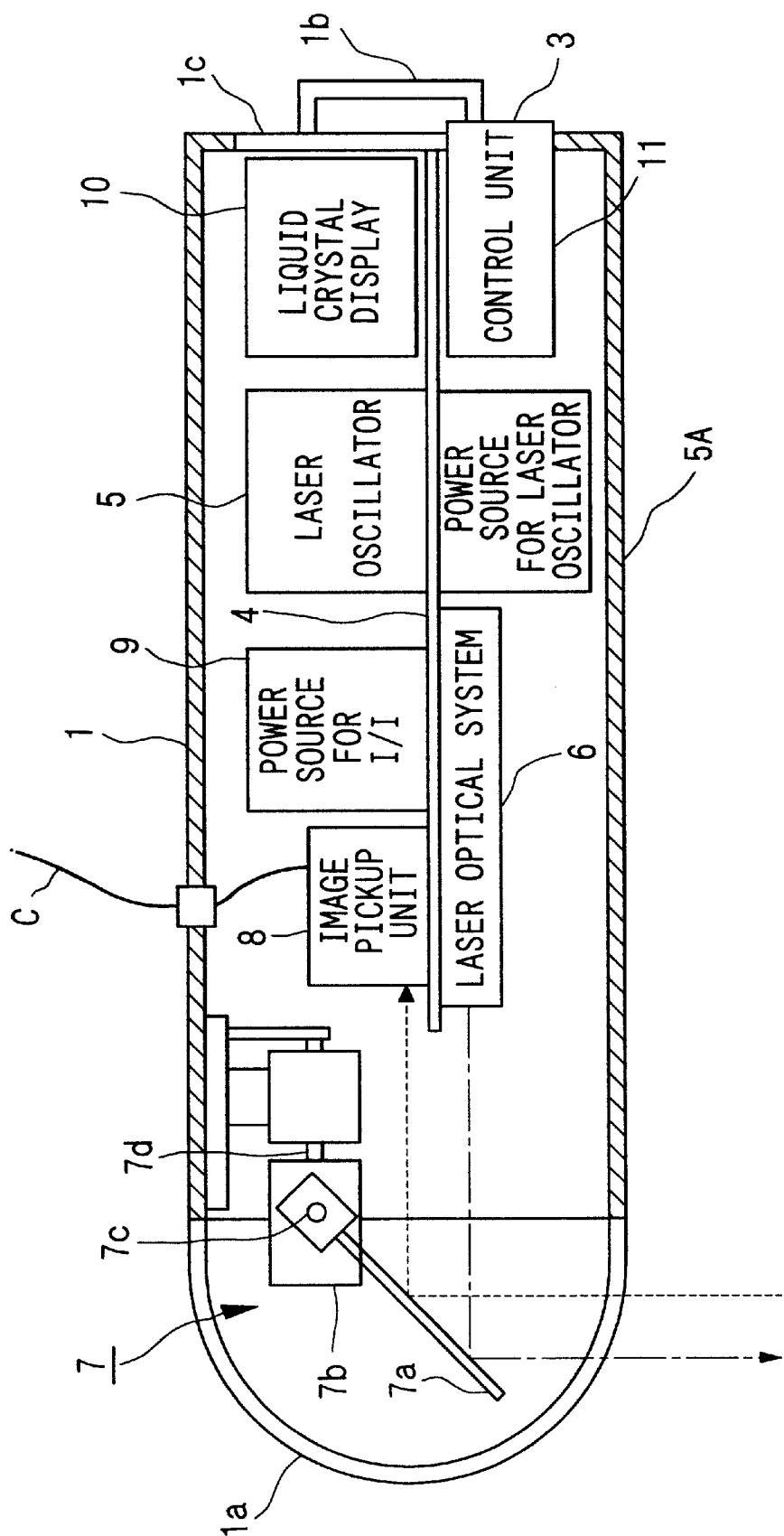
FIG. 3 is a plan view showing a construction of devices of the main body in the example of the underwater laser television in accordance with the present invention.

At first, a best mode of embodiment regarding an underwater laser television of the present invention will be described with reference to FIG. 1 to FIG. 3 described above.

Figure 1:
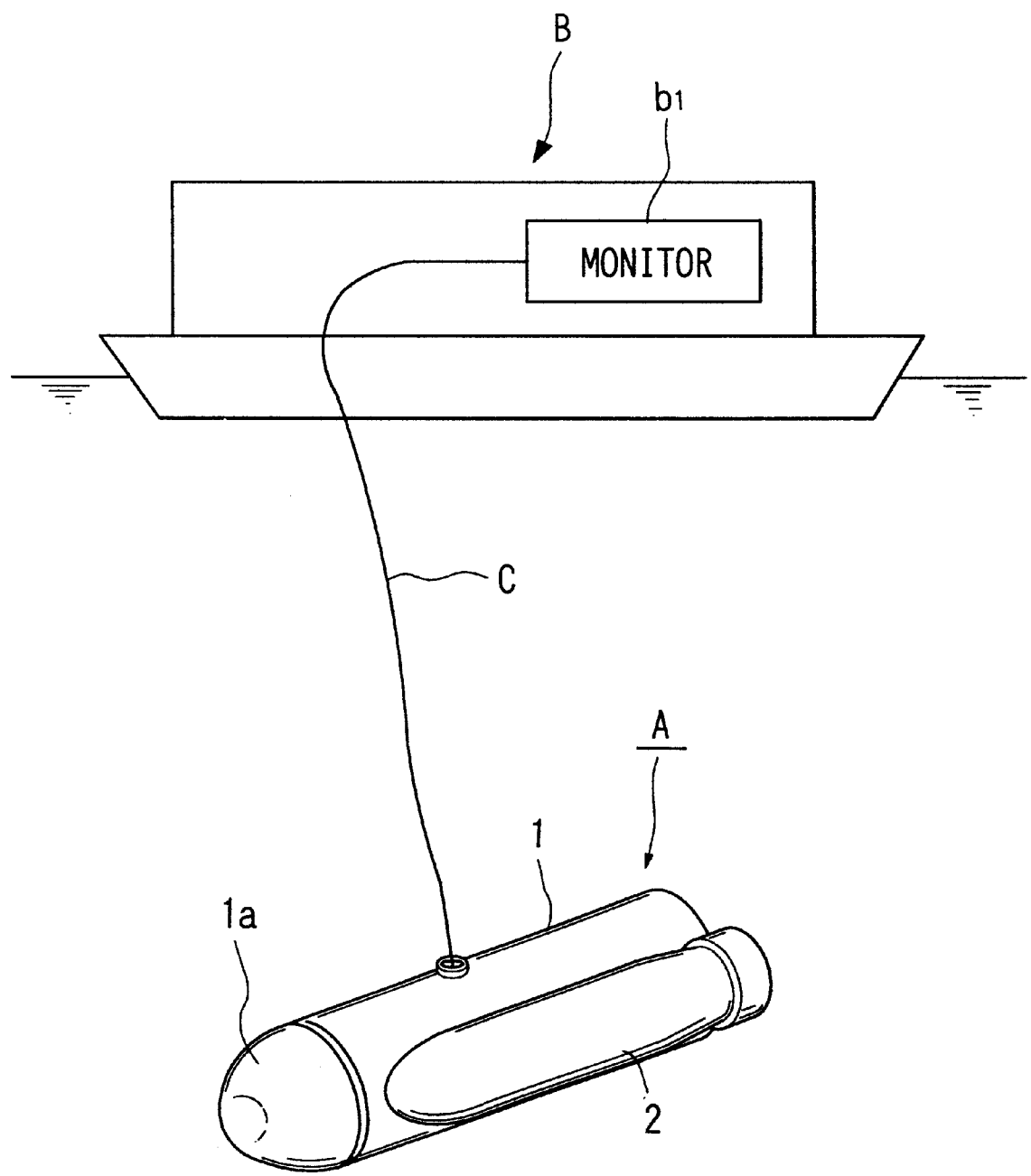
FIG. 1 is an outline figure showing an appearance construction of an example of an underwater laser television in accordance with the present invention.

In FIG. 1, a reference symbol A designates an underwater laser television located under water; B designates a support ship; and C designates an umbilical cable. The underwater laser television A is constructed by a cylinder-shaped main body 1 which is formed to resist against water pressure and a thruster unit 2 (thruster means). The main body 1 is formed by a pressure vessel to have a capability of resisting against water pressure under water at a depth of 10 meters or so, while it holds devices provided therein in a sealed state against the surrounding water thereof. At a tip portion of the main body 1, there is provided a dome-shaped light transmission portion 1a made by transparency members such as acryl and glass, so through this light transmission portion 1a, laser pulses given from the inside of the main body 1 are radiated to a visualized object under water and reflection light of the laser pulses from the visualized object is incoming, so that an image of the visualized object is picked up.

The thruster unit 2 is driven by a pair of motors, which are fixed at left and right sides of the main body 1. That is, the thruster unit 2 is driven so that the underwater laser television A moves under water. In FIG. 2, a reference symbol 1b designates a pair of handles, which are attached to left and right sides of the back (opposite side of the light transmission portion 1a) of the cylinder-shaped main body 1. These handles 1b are grasped by a diver or else who navigates the main body 1 with respect to the direction and the like, for example.

A reference symbol 1c designates a window portion, which is formed at the aforementioned back and which is formed by a transparent member such as an acryl board. Through the window portion 1c, the diver or else is capable of confirming an image of a visualized object displayed by a display means (described later) which is equipped in the main body 1. Similarly, a reference symbol 3 designates an operation panel, arranged at the back, which provides various kinds of switches for picking up images of visualized objects by the underwater laser television A, such as a switch to apply electric source power to the underwater laser television A and a switch to operate the thruster unit 2.

The underwater laser television A which is constructed above is connected to the support ship B on the water via the umbilical cable C. This support ship B is equipped with a monitor b1, to which video signals of the visualized object output from the underwater laser television A are input via the umbilical cable C. This umbilical cable C is provided to transmit the video signals of the visualized object to the support ship B and to supply a part of the source power, which the underwater laser television A requires, to the underwater laser television A. Incidentally, this source power is made as three-phase AC of 440 Volt and 60 Hz, for example, and is supplied to the underwater laser television A.

Next, a description will be given with respect to the details of the devices which are equipped in the aforementioned main body 1 in conjunction with FIG. 3. In this figure, a reference symbol 4 designates a common base board; 5 designates a laser oscillator; 5A designates a power source for the laser oscillator; 6 designates an optical system; 7 designates radiation direction setting means; 8 designates an image pickup unit; 9 designates a power source for I/I (Image Intensifier); 10 designates a liquid crystal display (display means); and 11 designates a control unit. The common base board 4 is fixed to the main body 1 in order to fix the devices in the main body 1, so the devices are each fixed to the main body 1 by means of the common base board 4.

The laser oscillator 5 oscillates pulse-like laser beams (laser pulses) by the electric power supplied from the power source 5A exclusively provided for the laser oscillator. As the laser oscillator 5, it is possible to employ a laser oscillator of the second harmonic generation (SHG) light having a wavelength of 532 nm among YAG (Yttrium Aluminum Garnet) laser oscillator, for example. Oscillation operation of the laser oscillator 5 is controlled based on synchronizing pulses supplied from the control unit 11, so the laser oscillator 5 oscillates laser pulses, whose number of repetition is 50 Hz and whose pulse width is 5 ns, for example, so that the laser pulses are output to the optical system 6. This laser oscillator 5 employs the Q switch method as the synchronous oscillation means, so it is capable of oscillating laser pulses of the high output with a good efficiency for the power source.

The optical system 6 is constructed by a lens and a reflection mirror, so it focuses the laser pulses, incoming from the laser oscillator 5, in the spot diameter while changing the light path to output them toward the radiation direction setting means 7. The radiation direction setting means 7 is the means that controls the radiation direction of the laser pulses output into the water through the light transmission portion 1a, so it is constructed by a reflection mirror 7a that provides full reflection of the laser pulses and a pan-tilt device 7b that sets a direction of the reflection mirror 7a. The pan-tilt device 7b is driven by a motor and is constructed in such a way that the reflection mirror 7a is subjected to rotary movement about a support point 7c within a plane that is parallel with the paper, and the reflection mirror 7a is also subjected to rotary movement within a plane that is perpendicular to the paper by rotating a shaft 7d.

In the radiation direction setting means 7 which is constructed above, the reflection mirror 7a provides the laser pulses, which are incoming from the optical system 6 to the reflection mirror 7a, into the water in a range from the front to the down or in a certain range of side directions. The laser pulses, which are provided into the water, are radiated to a visualized object, so reflection light reflected by the visualized object is incoming to the reflection mirror 7a through the light transmission portion 1a. The reflection mirror 7a reflects the reflection light given from the visualized object toward the image pickup unit 8.

The image pickup unit 8 is a kind of a supersensitive camera, which is constructed by an image pickup device, such as the image intensifier (I/I) and CCD (Charge Coupled Device) having the focus lens for adjusting the focus on the aforementioned reflection light, shutter function and light amplification function, as well as a scanning device or else. The image pickup unit 8, which is constructed above, produces video signals of the visualized object based on the reflection light of the laser pulses from the visualized object, so the video signals are output to the liquid crystal display 10 as well as the aforementioned umbilical cable C.

Incidentally, the aforementioned optical system 6, radiation direction setting means 8 and image pickup unit 8 construct the radiation and light receiving means.

The power source 9 for I/I is the power source exclusively provided for the aforementioned image intensifier. The liquid crystal display 10 is fixed to the common base board 4 in such a way that a display surface thereof faces the aforementioned window portion 1c. The control unit 11 is constructed by a CPU (Central Processing Unit) and a memory for storing a control program or else, so the devices are each controlled by the CPU which operates based on the control program and operation information input from the operation panel 3.

Incidentally, the aforementioned devices, except the laser oscillator 5 and image intensifier that have exclusive power sources because of the large amount of electric power consumption, are each driven by the AC power supplied from the support ship B via the umbilical cable C.

Next, the operation of the aforementioned underwater laser television will be explained.

First, a direction of the underwater laser television A is turned to match with a direction of a visualized object by a diver. At this time, by operating the thruster unit 2, it is possible to easily move a location of the underwater laser television A in the water. Herein, by taking the weight of the underwater laser television A into consideration in such a way that at the depth of water for the image pickup of the visualized object, the gravity and buoyancy effected on the underwater laser television A balance with each other, it is easy to retain the underwater laser television A in a stopped state.

When the direction of the underwater laser television A is set as described above, the laser oscillator 5 outputs laser pulses, which have a wavelength of 532 nm, a number of repetition of 50 Hz and a pulse width of 5 ns, so the laser pulses are radiated to the reflection mirror 7a by means of the optical system 6, whereby the laser pulses are reflected by the reflection mirror 7a and are radiated to the visualized object under water through the light transmission portion 1a. Herein, the wavelength of 532 nm of the laser pulses is the wavelength having a good transmission rate for the laser pulses under water, so the laser pulses are propagating through the water with a small loss and are radiated to the visualized object. At this time, the visualized object is subjected to radiation of the laser pulse with a constant spot diameter, so the radiating portion thereof reflects the laser pulse to produce reflection light. This reflection light is propagating through the water and is incoming to the light transmission portion 1a, so it is incoming to the reflection mirror 7a through the light transmission portion 1a and is reflected toward the image pickup unit 8.

This reflection light is subjected to light amplification by the image intensifier of the image pickup unit 8 and are then subjected to light-receiving operation and scanning by the image pickup device, so that it is converted to video signals of the visualized object. At this time, the focus lens is adjusted so that the focus of the reflection light is conformed with a light-receiving surface of the image pickup device, while the image intensifier opens and closes the shutter based on synchronizing pulses input from the control unit 11, so a part (time interval) of the pulse-like reflection light whose intensity is greater than a certain level, in other words, only a part of the reflection light corresponding to regular reflection light of the laser pulse is subjected to light-receiving operation of the image pickup device.

Herein, the light which is propagating through the water and is incoming to the underwater laser television A contains scattered light, which is generated by floating particles and the like under water, other than the regular reflection light caused by the visualized object to which the laser pulse is radiated. This scattered light does not reflect the state of the visualized object, so it is one kind of noise against the regular reflection light. Therefore, by opening and closing the shutter of the image intensifier so that only the regular reflection light is subjected to light-receiving operation of the image pickup device, it is possible to obtain an image of the visualized object with a high quality without eliminating the effect of the scattered light.

Video signals output from the image pickup unit 8 are input to the liquid crystal display 10, so that an image of the visualized object is displayed. The diver confirms the state of the visualized object by the image displayed on the liquid crystal display 10, so according to needs, the diver manipulates the pan-tilt device 7b using the operation panel 3 so that the image pickup location and the like of the visualized object can be adjusted. In addition, the video signals of the visualized object are provided from the image pickup unit 8 and are input to the monitor b1 on the support ship B via the umbilical cable C, so the image of the visualized object is displayed on the monitor b1 as well. That is, the monitor b1 on the support ship B also displays the same image of the visualized object that is displayed on the liquid crystal display 10 under water, so it is also possible to change the image pickup location by giving an instruction to the diver from the support ship B by some communication means.

Lastly, according to the underwater laser television A of the aforementioned present embodiment, the laser oscillator outputting the YAG-SHG light is employed as the laser oscillator 5, so as compared with the case where YAG-OPO (Optical Parametric Oscillator) that is capable of varying the wavelength even in the YAG laser oscillator is employed, it is possible to remarkably reduce the capacity of the power source 5A for the laser oscillator to ¹⁄₁₀ or so, for example. That is, the present underwater laser television A is capable of remarkably reducing the consumption of electric power, required for oscillation of the laser pulses, as compared with the conventional one, so it is possible to perform an image pickup operation for a long time while reducing a number of times for charging.

According to the present embodiment, it is possible to obtain effects as follows:

(1) Because the devices required for the image pickup operation of the visualized object and its image display are provided inside of the main body 1 which moves under water while being held by the diver, it is unnecessary to follow the conventional technology which is designed to fix the radiation and light-receiving means. Therefore, it is possible to perform the image pickup operation on the visualized object with good workability. Particularly, the present embodiment has a good workability in the case where multiple visualized objects are subjected to image pickup operations.

(2) Because the laser oscillator 5 is provided inside of the main body 1 which is located under water, it is unnecessary to follow the conventional technology that is designed to propagate laser pulses to the radiation and light receiving means under water from the support ship via the optical fiber, so it is possible to radiate the laser pulses, whose intensity is higher than the conventional one, to the visualized object. As a result, it is possible to obtain an image of the visualized object more clearly as compared with the conventional technology.

(3) The light transmission portion 1a is formed in a dome-like shape while the radiation and light receiving means is equipped with the radiation direction setting means which sets a radiation direction of laser pulses output toward the visualized object via the light transmission portion 1a, so under the state where the direction of the main body 1 is determined, it is possible to radiate the laser pulses for a certain range. Therefore, for example, by confirming an image of the visualized object displayed on the liquid crystal display 10 while the direction of the main body 1 is set, it is possible to correct the image pickup location and the like.

Next, a best mode of embodiment regarding an underwater laser visualization device of the present invention will be explained with reference to FIG. 4 to FIG. 7.

Figure 4:
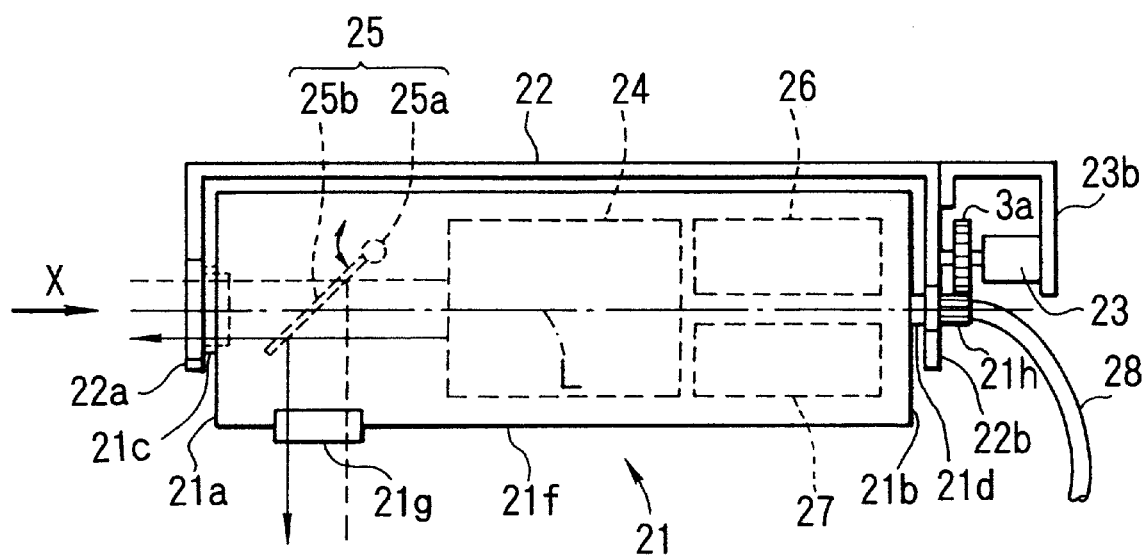
FIG. 4 is a front view showing an appearance construction of an example of an underwater laser visualization device in accordance with the present invention.

In FIG. 4, a reference symbol 21 designates a pressure-proof vessel of a cylindrical shape, wherein shafts 21c, 21d whose rotation center corresponds to a center axial line L of the cylinder-shaped pressure-proof vessel 21 are respectively provided at ends 21a, 21b. In addition, a circular light transmission window 21e for transmitting light is provided at the center of the end 21a of the pressure-proof vessel 21, while a light transmission window 21g is provided in proximity to the light transmission window 21e on a periphery 21f of the pressure-proof vessel 21 to conform with a direction perpendicular to the center axial line L. These light transmission windows 21e, 21g are formed by the glass or acryl plate.

Figure 5:
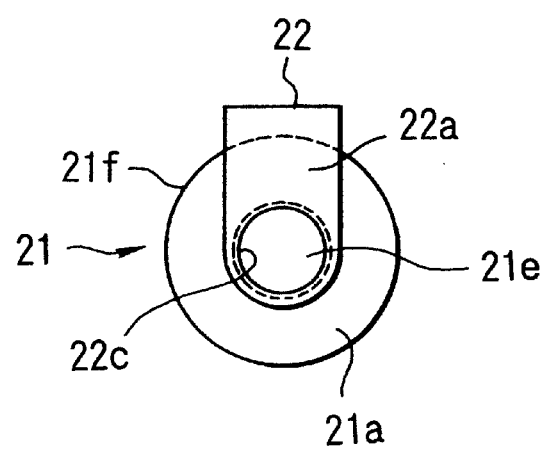
FIG. 5 is a side view showing an appearance construction of the example of the underwater laser visualization device in accordance with the present invention.

The shaft 21c provided at the end 21a is hollow and is formed in such a way that when observing the end 21a from a direction of arrow X, the light transmission window 21e can be seen as shown in FIG. 5. In addition, the shafts 21c, 21d of the pressure-proof vessel 21 are respectively supported by end portions 22a, 22b of a mounting frame 22 (mounting means) formed in a rectangular-U-like shape by means of bearings and the like such that they can rotate freely. That is, the pressure-proof vessel 21 is supported by the mounting frame 22 such that it is put between the end portions 22a, 22b of the mounting frame 22 and such that it can rotate freely.

A gear 21h is provided at the tip of the shaft 21d of the pressure-proof vessel 21, wherein the gear 21h engages with a gear 23a attached to a shaft of a motor 23. The motor 23 is a stepping motor that is capable of setting a rotation angle with a high precision, wherein it is supported by the mounting frame 22 by means of a bracket 23b. A hole 22c is provided on the end portion 22a of the mounting frame 22 at a position conforming with the aforementioned light transmission window 21e, so as described above, the light transmission window 21e is visible from the direction of arrow X. Such mounting frame 22 is mounted on the self-contained navigation device which performs self-contained navigation in the water by the remote operation or the navigation device or else which navigates in the water under the assistant operation of the diver, for example.

Further, the pressure-proof vessel 21 is constructed to have a capability of resisting against the water pressure at the depth of 10 meters under water, so the inside thereof is remained in a sealed state against the surrounding water. Inside of the pressure-proof vessel 22, devices for picking up images of visualized objects located under water such as a laser transmission and light receiving device 24, a light course setting device 25, a power source 26 and a control device 27, for example, are stored.

Figure 6:
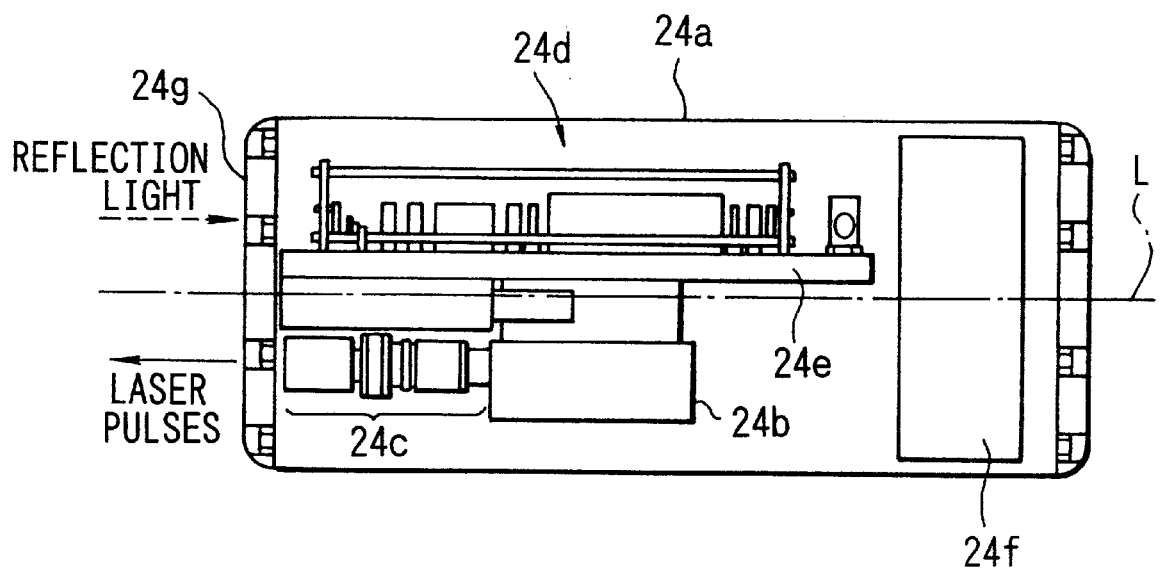
FIG. 6 is a front view showing a construction of a laser radiation and light receiving device in the example of the underwater laser visualization device in accordance with the present invention.
Figure 7:
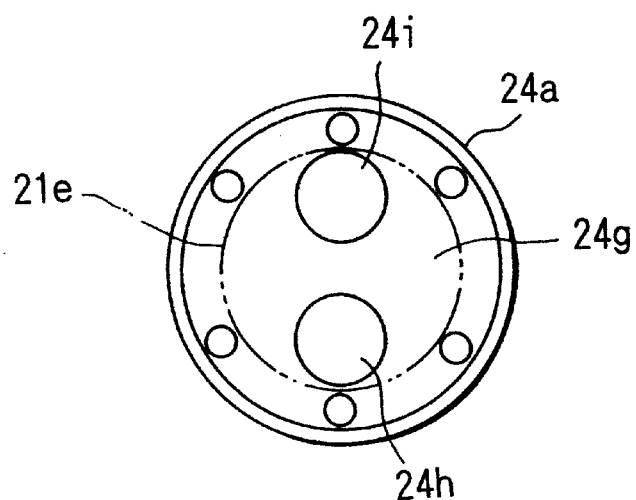
FIG. 7 is a side view showing a construction of the laser radiation and light receiving device in the example of the underwater laser visualization device in accordance with the present invention.

Next, a detailed construction of the aforementioned laser transmission and light receiving device 24 will be explained with reference to FIG. 6. In this figure, a reference symbol 24a designates a cylinder-shaped base body having a waterproof function. Inside of the base body 24a, there are provided a laser oscillator 24b, an optical system 24c and an image pickup device 24d arranged and fixed to a common frame 24e, and there is provided a water tank 24f which is used to retain balance of the pressure-proof vessel 21 in the water and to cool the laser oscillator 24b. A YAG laser oscillator which generates second harmonic light (wavelength: 532 nm) is employed as the laser oscillator 24b, which oscillates laser pulses, whose number of repetition is 50 Hz and whose pulse width is 5 ns, for example, so the laser pulses are output toward the optical system 24c.

The optical system 24c effects the optical process such as light parallelization on the laser pulses. The image pickup device 24d receives reflection light which is obtained by reflection of the laser pulse on the visualized object, so it produces video signals of the visualized object based on the reflection light. The image pickup device 24d provides a shutter function and a light amplification function to perform light amplification on weak reflection light as well as an image intensifier by which the reflection light is selectively received by light receiving components in synchronism with the pulse period of the laser pulses.

The cylinder-shaped base body 24a is fixed to the inside of the pressure-proof vessel 21 in a direction such that the center axis thereof conforms with the aforementioned center axial line L, namely, such that it is placed in a concentric manner with the pressure-proof vessel 21 as well as such that an end portion 24g faces in parallel with the light transmission window 21e. On the end portion 24g, there are provided a laser pulse transmission window 24h for transmitting the laser pulses and a reflection light transmission window 24i for transmitting the reflection light. The optical system 24c is fixed to the base body 24a such that an optical axis thereof is placed in parallel with the center axial line L to conform with the laser pulse transmission window 24h, while the image pickup device 24d is fixed to the base body 24a such that an optical axis thereof is placed in parallel with the center axial line L to conform with the reflection light transmission window 24i. The laser pulse transmission window 24h and reflection light transmission window 24i are formed by plates made of the glass or acryl, wherein when being observed from a direction of arrow X in FIG. 7, they are formed in sizes and positional relationships such that they overlap with the light transmission window 21e.

The aforementioned light course setting device 25 is provided between the laser transmission and light receiving device 24 and the end 21a of the pressure-proof vessel 21, wherein it is a full reflection mirror 25b supported by a rotation shaft 25a. The rotation shaft 25a is provided in a direction perpendicular to the light transmission window 21g, shaped in a flat plate, and the center axial L, wherein it is driven by an actuator such as a stepping motor. The control device 27 comprehensively controls operations of the laser oscillator 24b and image pickup device 24d, wherein it is configured by a CPU and a memory storing a control program or else.

The power source 26 supplies electric power to the laser oscillator 24b and image pickup device 24d. Particularly, the laser oscillator 24b and the foregoing image intensifier have large amounts of consumption of electric power, so the capacity of the power source 26 is set in response to consumption of electric power of these devices. In addition, a reference symbol 28 designates an umbilical cable, which outputs video signals of the visualized object to the external while inputting operation information, input from the external, to the control device 27.

Next, a description will be given with respect to the underwater laser visualization device, which is constructed above. As described above, the present underwater laser visualization device is used by being attached to the navigation device or else that runs in the water; in this case, the end 21a is placed in a navigating direction (forward direction). And, the operation information of the operation means provided on the navigation device is input to the control device 27 via the umbilical cable 28, so that an image pickup operation is started.

When the image pickup operation is started, laser pulses are output from the laser oscillator 24b and are output to the front via the optical system 24c and laser pulse transmission window 24h. Herein, if the visualized object is an architecture which is provided in front of the navigation device, the control device 27 operates the light course setting device 25 so as to establish a state where the full reflection mirror 25b does not shut up the progression course of the laser pulses. As a result, the laser pulses are selectively incoming to the light transmission window 21e and is radiated to the visualized object located in the front. And, the laser pulses are reflected by the visualized object, so reflection light is incoming to the light transmission window 21e.

Further, this reflection light is incoming to the image pickup device 24d via the reflection light transmission window 24i, so it is possible to produce video signals of the visualized object which is located to face with the underwater laser visualization device and is separated from the underwater laser visualization device by a certain distance in the water. The video signals are given from the image pickup device 24d and is extracted to the external via the umbilical cable 28, so they are input to and displayed by a monitor equipped on the navigation device or a monitor equipped on the support ship on the water.

Meanwhile, in the case where an image is picked up with respect to a state of the bottom of the water instead of the architecture, the light course setting device 25 is driven, so an angle of a reflection surface of the full reflection mirror 25b is set such that laser pulses output from the laser transmission and light receiving device 24 are incoming to the light transmission window 21g. As a result, the laser pulses are radiated to the bottom of the water in a direction perpendicular to the front of the navigation device, while the motor 23 is driven so that the pressure-proof vessel 21 is subjected to rotation using the center axial line L as a rotation center, so a radiation direction of the laser pulses is adjusted within a plane perpendicular to the center axial line L.

The laser pulses whose radiation direction is set as described above are reflected by the bottom of the water, so corresponding reflection light is incoming to the full reflection mirror 25b via the light transmission window 21g and is further subjected to full reflection toward the image pickup device 24d so that video signals are produced. In this case, it is possible to change the radiation direction of the laser pulses without changing a direction of the navigation device, so it is possible to improve workability of the image pickup operation.

Incidentally, the aforementioned embodiment employs a construction that the power source, which is a relatively heavy weight object, is arranged inside of the pressure-proof vessel, however, easy operation and good workability of the image pickup operation can be assured with respect to the pressure-proof vessel, having light weight, which is fixed to the navigation device. Therefore, another embodiment can be proposed such that the power source is arranged inside of another pressure-proof vessel for the power source, which is connected with the pressure-proof vessel fixed to the navigation device by an electric power cable. In this case, the pressure-proof vessel for the power source is arranged relatively in proximity to the navigation device.

According to the underwater laser visualization device of the present embodiment, it is possible to provide effects as follows:

(1) The oscillator which is capable of outputting YAG-SHG light is employed as the laser oscillator 24b, so as compared with the case where YAG-OPO (Optical Parametric Oscillator) is employed, it is possible to remarkably reduce the capacity of the power source 26 to 1/10 or so. That is, it is possible to remarkably reduce the consumption of electric power, required for the oscillation of the laser pulses, as compared with the conventional technology.

(2) Each of the light transmission windows 21e, 21g is formed in a flat-plate shape, so as compared with the case where a bent light transmission window is used, the laser pulses and reflection light are not refracted so much when being transmitted through the light transmission window, therefore, it is possible to suppress distortion of the image of the visualized object due to the light transmission window.

(3) It is unnecessary to perform transmission of laser pulses, like the conventional technology, from the water-surface into the water by using the optical fiber cable, so it is possible to increase the intensity of the laser pulses radiated to the visualized object, therefore, as compared with the conventional technology, it is possible to obtain a more clear image of the visualized object.

(4) Because the light course setting device 25 is constructed by a semitransparent mirror which transmits a part of laser pulses toward the light transmission window 21e while reflecting a further part of it toward the light transmission window 21g or a full reflection mirror which is supported in a direction perpendicular to a reflection surface in a free rotation manner and which changes a rotation angle to propagate laser pulses to the light transmission window 21e or reflect them to the light transmission window 21g, the construction is simple.

(5) In the case where an underwater navigation device which runs in the water is employed as a support body, movement in the water becomes further easy, so workability of the image pickup operation is improved.

(6) Because the YAG laser oscillator which generates second harmonic light is employed as the laser oscillator 24b, as compared with the case where laser pulses are oscillated using a laser oscillator of a parametric oscillation type, it is possible to remarkably reduce the consumption of electric power.

What is claimed is:

1. An underwater laser television which radiates laser pulses, output from a laser oscillator, to a visualized object under water so as to detect reflection light of the laser pulses to display an image of the visualized object, said underwater laser television characterized by comprising:
   a main body which is located under water to have a capability of free movement and to resist against water pressure, wherein a light transmission portion is provided to transmit the laser pulses and reflection light;
   said laser oscillator which is arranged inside of the main body;
   radiation and light receiving means, arranged in the main body, for radiating the laser pulses toward the visualized object and for detecting the reflection light to produce video signals of the visualized object; and
   display means, arranged in the main body, for displaying an image of the visualized object based on the video signals.

2. An underwater laser television as defined in claim 1 wherein the light transmission portion is formed in a dome-like shape, while the radiation and light receiving means provides radiation direction setting means for setting a radiation direction of the laser pulses output toward the visualized object via the light transmission portion.

3. An underwater laser television as defined in claim 2 wherein the main body comprises thruster means providing a capability of running through the water.

4. An underwater laser television as defined in claim 2 wherein the laser oscillator is a YAG laser oscillator generating second harmonic light.

5. An underwater laser television as defined in claim 1 wherein the main body comprises thruster means providing a capability of running through the water.

6. An underwater laser television as defined in claim 5 wherein the laser oscillator is a YAG laser oscillator generating second harmonic light.

7. An underwater laser television as defined in claim 1 wherein the laser oscillator is a YAG laser oscillator generating second harmonic light.

8. An underwater laser visualization device which radiates laser pulses to a visualized object so as to produce an image of the visualized object based on reflection light of the laser pulses, said underwater laser visualization device characterized by comprising:
   a laser transmission and light receiving device for outputting the laser pulses and for receiving the reflection light to produce the image of the visualized object;
   a light course setting device for setting a course of the laser pulses, output from the laser transmission and light receiving device, to coincide with a first direction or a second direction perpendicular to the first direction, and for setting a course of the reflection light, incoming from the first direction or the second direction, to coincide with a receiving light axis of the laser transmission and light receiving device;
   a pressure-proof vessel for storing the light course setting device and the laser transmission and light receiving device, and for providing first and second light transmission windows for transmitting the laser pulses and the corresponding reflection light, courses of which are set by the light course setting device; and
   mounting means, fixed by a support body, for supporting the pressure-proof vessel to have a capability of free rotation while using the first direction as a direction of a rotation axis.

9. An underwater laser visualization device as defined in claim 8 wherein a power source unit of the laser transmission and light receiving device is stored in a pressure-proof vessel for power source which is provided independently of the pressure-proof vessel, so that the pressure-proof vessel and the pressure-proof vessel for power source are connected together by a power source cable.

10. An underwater laser visualization device as defined in claim 9 wherein each of the light transmission windows is formed in a flat-plate shape.

11. An underwater laser visualization device as defined in claim 10 wherein the light course setting device is a semi-transparent mirror which transmits a part of the laser pulses toward the first light transmission window while reflecting a part of it toward the second light transmission window.

12. An underwater laser visualization device as defined in claim 10 wherein the light course setting device is a full reflection mirror which is supported in a direction perpendicular to a reflection surface to have a capability of free rotation and which changes a rotation angle to propagate the laser pulses to the first light transmission window or reflect them to the second light transmission window.

13. An underwater laser visualization device as defined in claim 9 wherein the light course setting device is a semi-transparent mirror which transmits a part of the laser pulses toward the first light transmission window while reflecting a part of it toward the second light transmission window.

14. An underwater laser visualization device as defined in claim 9 wherein the light course setting device is a full reflection mirror which is supported in a direction perpendicular to a reflection surface to have a capability of free rotation and which changes a rotation angle to propagate the laser pulses to the first light transmission window or reflect them to the second light transmission window.

15. An underwater laser visualization device as defined in claim 9 wherein the support body is an underwater navigation device having a capability of running in the water.

16. An underwater laser visualization device as defined in claim 9 wherein the laser oscillator is a YAG laser oscillator generating second harmonic light.

17. An underwater laser visualization device as defined in claim 8 wherein each of the light transmission windows is formed in a flat-plate shape.

18. An underwater laser visualization device as defined in claim 17 wherein the light course setting device is a semi-transparent mirror which transmits a part of the laser pulses toward the first light transmission window while reflecting a part of it toward the second light transmission window.

19. An underwater laser visualization device as defined in claim 17 wherein the light course setting device is a full reflection mirror which is supported in a direction perpendicular to a reflection surface to have a capability of free rotation and which changes a rotation angle to propagate the laser pulses to the first light transmission window or reflect them to the second light transmission window.

20. An underwater laser visualization device as defined in claim 8 wherein the light course setting device is a semi-transparent mirror which transmits a part of the laser pulses toward the first light transmission window while reflecting a part of it toward the second light transmission window.

* * * * *